Jan. 12, 1954　　　　A. W. LUNDELL　　　2,665,725
FOOD CHOPPER
Filed April 10, 1953　　　　　　　　　　2 Sheets-Sheet 2
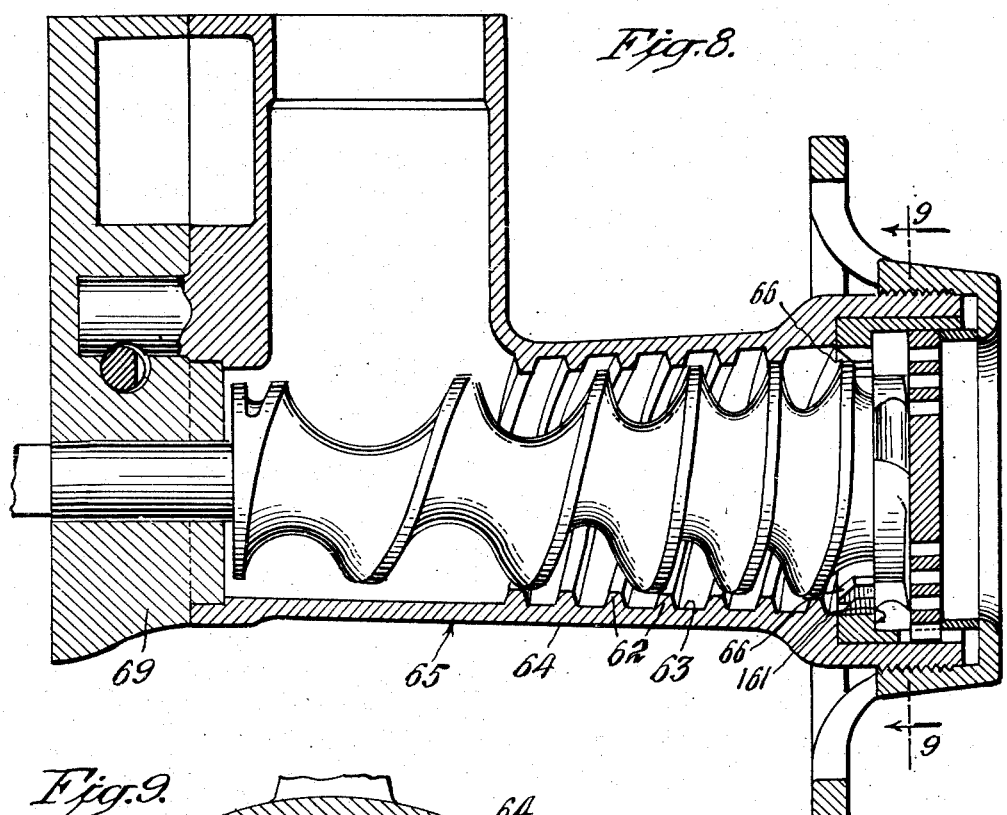
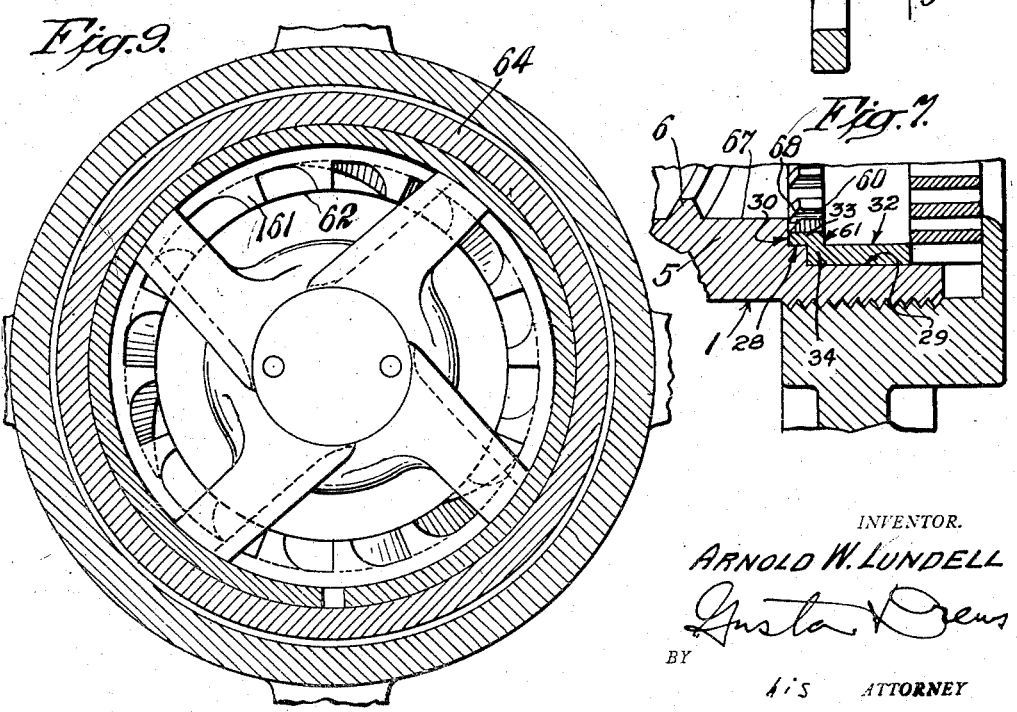
INVENTOR.
ARNOLD W. LUNDELL
BY
HIS ATTORNEY Patented Jan. 12, 1954

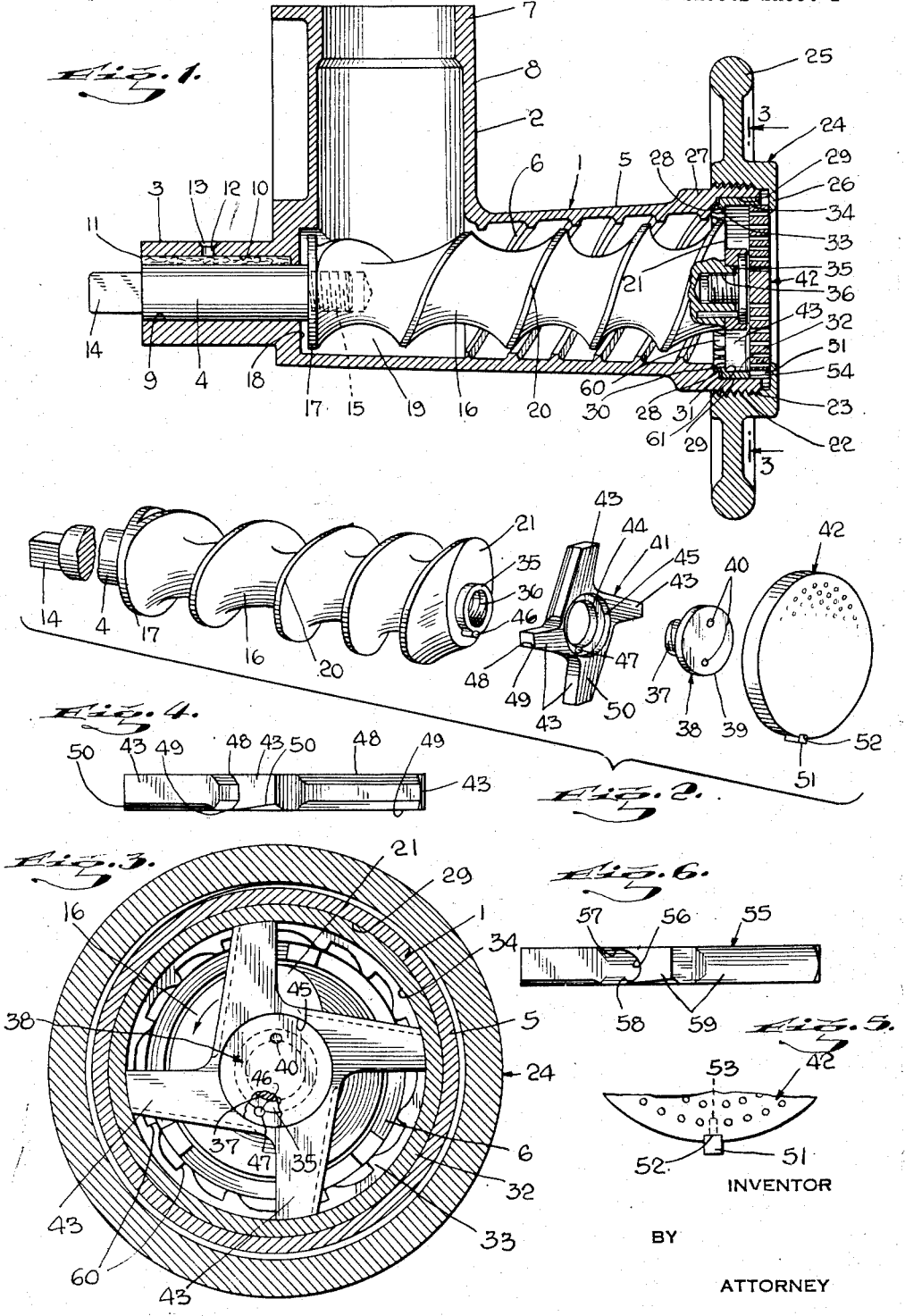

2,665,725

UNITED STATES PATENT OFFICE 2,665,725

FOOD CHOPPER

Arnold W. Lundell, Byram, Conn., assignor to Globe Slicing Machine Co., Inc., Stamford, Conn., a corporation of New York Application April 10, 1953, Serial No. 347,903

5 Claims. (Cl. 146—189)

This invention relates to food choppers in general and more especially to meat choppers of the type illustrated in United States Letters Patent 2,505,797, issued May 2, 1950, and constitutes a continuation in part of the application filed September 25, 1951, Ser. No. 248,121.

Among the objects of the present invention it is aimed to provide an improved meat chopper of the type illustrated in the aforesaid patent by means of which the processing of meat consists in tearing meat chunks as they are advanced by a worm past a plurality of spiral stationary ribs, then shearing the meat chunks so torn by long shearing blades cooperating with stationary longitudinally extending cutting teeth which will simultaneously mix or tumble the meat chunks to effect an intermittent commingling of the lean and fat portions of the meat as well as the gristle, if any, then further shearing the meat particles and only subjecting the same to any squeezing action when discharging the same through the conventional perforated discharge disk after they had been so torn, sheared and mixed, in which the shearing and final cutting of the meat particles is effected by the rear and front cutting edges, respectively, of comparatively long arms of a single cutter, which arms cooperate with the worm in tumbling and mixing the meat particles so torn and sheared and in relieving the squeezing pressure on the meat particles as they are discharged through the perforated disk by the intermittent cutting of the meat particles before they enter the perforations in the disk to emerge as streams or ribbons of meat, resulting in the following advantages: (1) reducing to a minimum any squeezing action on the meat as it is being cut, thereby to retain the blood, serum, and meat juices, and (2) positively belaboring all areas through which the meat passes to eliminate any offside pockets which might harbor any meat particles thereby to reduce to a minimum the accumulation of any meat particles in the casing during the processing of any given supply of meat or when processing successive supplies.

These and other features, capabilities and advantages of the present invention will appear from the subjoined detailed description of specific embodiments of the invention illustrated in the accompanying drawings, in which Fig. 1 is a transverse section of an improved meat chopper made according to one embodiment.

Fig. 2 is an exploded view of the worm, cutter, anchoring nut and perforated disk of the meat chopper illustrated in Fig. 1.

Fig. 3 is a section enlarged on the line 3—3 of Fig. 1.

Fig. 4 is an end view of the cutter shown in Fig. 2.

Fig. 5 is a fragmental detail of the perforated disk.

Fig. 6 is an end view similar to Fig. 4 of a cutter made according to a second embodiment.

Fig. 7 is an enlarged fragmental section showing one relationship of the fixed teeth to the cutter.

Fig. 8 is an enlarged transverse section showing another relationship of the fixed teeth to the cutter.

Fig. 9 is a section on the line 9—9 of Fig. 8.

In the embodiment shown in Figs. 1 to 4, inclusive, there is provided a casing 1 somewhat T-shaped, having an upwardly extending tubular extension 2 constituting the inlet funnel, a diminished rearwardly extending tubular extension 3 constituting a journal for the stub shaft 4, and a forwardly extending tubular extension 5 having, in the present instance, a plurality of spiral ribs 6 parallel to one another and formed in threes, extending inwardly from the inner face of the tubular extension 5.

The extension 2 is substantially cylindrical having a narrow neck 7 and a main cylindrical portion 8 in communication with the opening 9 in the extension 3 and the chamber in the extension 5. The opening 9 is substantially cylindrical having a longitudinally extending recess 10 to receive the packing 11 serving as a lubricant carrier for receiving oil or the like through the opening 12 which is normally closed by a screw 13 as shown.

The stub shaft 4 is shown in the present instance as provided with an angular projection 14 to cooperate with a coupling or the like connected to a motor shaft, not shown. The shaft 4, in the present instance, has a screw threaded extension 15, which is screw threadedly connected to the rear end portion of the worm 16. The rear end portion of the worm 16 is formed into a disk 17, the rear face of which is disposed in a plane extending radially to the axis of the worm 16 and shaft 4, and is spaced from the rear face 18 of the chamber 19. From the disk 17 the spiral rib 20 preferably has a flatter pitch where it registers with the tubular extension 2, continuing into a sharper pitch as it begins to register with the ribs 6, and then continuing in a still sharper pitch, and finally flattening out a little as it approaches the front end of the worm 16. In the present instance the ribs 6 of the extension 5 are substantially parallel to one another, and if anything, have a pitch which is flatter than the pitch of the rib 6, in the interest of cooperating with the rib 20 to advance the meat from the rear to the front of the tubular extension 5. The front end of the worm 16 also terminates in a plane face 21 somewhat elliptical in shape and also extending radially to the axis of the worm 16, see Fig. 2.

The outer periphery of the front end of the tubular extension 5 is enlarged and provided with an external thread 22 to receive the internal thread 23 of the conventional locking ring 24 having the annular handle 25 and the inwardly extending annular flange 26. The inner face of the enlarged portion 27 of the tubular extension 5 has a rear annular recess 28 where the front end of the ribs 6 terminate and a front tubular annular recess 29 forming the radially extending shoulders 30 and 31, respectively. In the enlargement 27 there is positioned the sleeve 32, preferably composed of a hardened tool steel, as compared to the metal of the casing 1 which is preferably composed of high nickel cast iron known commercially as "Ni-Resist." This sleeve is stepped having the diminished smaller diameter annular portion 33 and the wide larger diameter annular portion 34, the rear radially extending edge of the portion 33 being positioned to engage the shoulder 30, and the outer periphery of the sleeve 32 being otherwise pressfit into the recesses 28 and 29 with the front edge of the annular portion 34 being spaced from the front edge of the enlargement 27 as shown in Fig. 1.

From the plane face 21 of the worm 16 there extends an annular collar 35 concentric with the axis of the worm 16, the opening of which constitutes a continuation of the cylindrical opening 36 in the worm 16 which is threaded to receive the threaded end 37 of the anchoring nut 38 having the cylindrical head 39 with spanner wrench openings 40 formed therein.

The construction of the cutter 41 now to be described constitutes one of the features of the invention making possible the cooperation of the same with the worm 16 and the perforated disk 42. The cutter 41, in the present instance, has four blades or arms 43 having a central opening 44 to snugly fit the collar 35 and an annular recess 45 to receive the outer portion of the head 39 of the nut 38. Preferably as shown in Fig. 1, since the recess 45 in depth is greater than the thickness of the head 39 when the nut 38 is secured in place, its front face will be disposed below the front face of the cutter 41.

In order to anchor the cutter 41 against rotation relative to the worm 16 when locked in position on the collar 35, there is provided the round pin 46 constituting the key extending parallel to the axis of the worm 16 and into the worm 16 so that its exposed length extends along the outer periphery of the collar 35, and the cutter 41 is provided with a recess 47 to receive such key 46.

The arms 43 of the cutter 41 shown in Fig. 4 are identical to one another with the rear face plane and radial to the axis of the worm, and the outer portions of the plane radially extending faces engaging the annular shoulder 30 to take up the end thrust of the worm, bearing in mind that the rear face of the portion 17 is spaced from the rear face of the chamber 19. The outer peripheries of the arms 43 in turn are arcuate conforming to the arc of the inner periphery of the sleeve portion 34 to take up the radial thrust of the worm 16. The leading edges of the arms 43 are inclined to the radius, almost tangential to the outer periphery of the head 39 of the nut 38 and provided with rear cutting edges 48 and front cutting edges 49. The front faces of the arms 43 are inclined as shown at 50 receding from the cutting edges 49 so that the cutting edges 49 alone engage the rear face of the perforated disk 42. In order to anchor the perforated disk 42 against rotation it is provided with a key 51 which extends into the recess 52 extending radially toward the center of the disk 42 and is provided with a pin or projection 53 which extends into the disk 42 in a radial direction. In assembled position, after the cutter 41 is secured in position by the nut 38, the disk 42 is placed within the portion 34 of the sleeve 32 with the shoulder 61 of the sleeve 32 in engagement with the cutting edges 48 of the cutter 41 and the key 51 positioned in the keyway 54 formed in the portion 34 of the sleeve 32, and thereupon the locking ring 24 turned until its flange 26 engages the disk 42 and anchors it securely in engagement with the cutting edges 49 of the cutter 41. In this way the disk 42 will of course only engage very limited areas, to wit, substantially only the cutting edges 49 of the cutter 41.

In turn, since the thread 20 of the worm 16 will at all times while rotating continue to move forward whatever meat particles are contained in the casing 1, in the conventional way, and the arms 43 of the cutter 41 will then receive the meat particles advanced to it by the worm 16 and continue to cut and rotate such meat particles until they are discharged through the perforated disk 42, no pockets will be provided to harbor any idle meat particles so important in the interest of sanitation.

The cutter 55 shown in Fig. 6 as distinguished from the cutter 41 shown in Fig. 4 has a concave arcuate recess 56 formed between the rear cutting edge 57 and the front cutting edge 58 of each arm 59, with the arm formed so that the rear cutting edge 57 is spaced a greater distance from the center of the cutter 55 than it is adjacent cutting edge 58 in order still further to aid in advancing the food as it passes the cutting edge 57 toward the cutting edge 58, and in turn toward and through the perforated disk 42.

After the meat chunks are advanced by the worm 16 and during the advancement thereof torn and cut by cooperation of the spiral rib 20 with the rib 6, they will pass into engagement with longitudinally extending cutting teeth 60 projecting inwardly from the portion 33 of the sleeve 32. The front edges of the cutting teeth 60 terminate at the front edge of the portion 33 and are in alinement with the shoulder 61 thereof so that the rear cutting edges 48 of the cutter 41 will cooperate with the cutting teeth 60 to shear off the chunks of meat advanced past the cutting teeth 60.

In the embodiment shown in Figs. 8 and 9, the inner edges in a radial direction of the teeth 161 terminate in alinement with the inner edges in a radial direction of the ribs 62 instead of with the inner face or periphery 63 of the tubular extension 64 of the casing 65 as is the case with the inner edges in a radial direction of the teeth 60 of the embodiment illustrated in Figs. 1 and 7, and the rear flaring faces 66 of the teeth 161 taper inward radially and outward axially from a point in alinement with the inner periphery 63 of the extension 64 to the inner edges radially of the teeth 161, instead of tapering inward radially and outward axially from a point radially outward of the inner periphery or face 67 of the casing 1 to a point in alinement with the inner periphery or face 67 as is the case with the flaring faces 68 of the teeth 60 of the embodiment illustrated in Figs. 1 and 7. The rear end of the casing 65 and the fixed casing section 69 associated therewith is typical of the embodiment illustrated in Fig. 4 of my Patent No. 2,539,448 dated January 30, 1951.

It is obvious that various changes and modifications may be made to the details of construction without departing from the general spirit of the invention as set forth in the appended claims.

I claim:

1. In a food chopper, the combination of a tubular casing having an inner face with an outlet at one end and an inlet at the other end, at least one helical rib extending radially and inwardly from said face, there being a narrow annular recess in said face adjacent to said outlet, a hard metal ring seated in said annular recess and having a plurality of teeth terminating at their inner radially extending ends in substantial alinement with said rib, there being a smooth narrow annular recess in said ring extending axially outward from said teeth and forming a cylindrical bearing face, the axial outer faces of said teeth forming a radially extending shoulder, a worm rotatably mounted in said casing for advancing the food to be cut in an axially outward direction toward said teeth and said outlet, a narrow cutter mounted on the discharge end of the worm to rotate with the same and having at least three radially extending arms having their outer peripheries cooperating with said cylindrical bearing face to take up the radial thrust of said worm, said cutter having axial inner and outer cutting edges and said inner cutting edges being in operative engagement with the outer faces of said teeth, and a circular disk having an annular series of small holes disposed about a circular imperforate area, the outer periphery of said disk conforming to said smooth annular recess and anchored in the same with the axial outer cutting edges of said cutter in operative engagement with the axial inner face of said disk and the worm extending into the area between said cutting teeth whereby residual meat left in the meat chopper is reduced to a small amount.

2. In a food chopper, the combination of a tubular metal casing having an inner face with an outlet at one end and an inlet at the other end, at least one internal rib extending radially and inwardly from said face and terminating adjacent the outlet end, there being an annular recess in said face adjacent said outlet, a ring composed of hard metal compared with the metal of the casing, said ring being seated in said annular recess and having a plurality of teeth and a cylindrical bearing face, a worm rotatably mounted in said casing for advancing the food to be cut in an axially outward direction and toward said cutting teeth and said outlet, a cutter mounted on the discharge end of the worm to rotate with the same and having a plurality of arms having their outer peripheries cooperating with said cylindrical bearing face to take up the radial thrust of said worm, said cutter having axial inner and outer cutting edges, and said inner cutting edges being in operative engagement with the outer faces of said teeth, and a disk having a plurality of perforations disposed therein anchored in operative engagement with the axial outer cutting edges of said cutter, said cylindrical bearing face extending from said teeth to said disk and the outer peripheries of said cutter similarly extending from said teeth to said disk to fully sweep the space between said cutting teeth and said disk to eliminate the occurrence of pockets for harboring any meat particles and the worm extending into the area between said teeth whereby the residual meat left in the meat chopper is reduced to a small amount.

3. In a food chopper, the combination of a tubular casing having an inner face with an outlet at one end and an inlet at the other end, at least one helical rib extending radially and inwardly from said face with a valley at the discharge end thereof, there being an annular recess between said face and said outlet, a hard metal ring in said annular recess having a plurality of teeth in the valley and having a cylindrical bearing face, the axial outer faces of said teeth forming a radially extending shoulder, a worm rotatably mounted in said casing for advancing the food to be cut in an axially outward direction and toward said cutting teeth and said outlet, a narrow cutter fixed on the discharge end of the worm to rotate with the same and having at least three radially extending arms having their outer peripheries cooperating with said cylindrical bearing face to take up the radial thrust of said worm, said cutter having axial inner and outer cutting edges and said inner cutting edges being in operative engagement with the outer faces of said teeth to shear the food being cut and to take up the end thrust of said worm, and a circular disk having a plurality of perforations disposed about a circular imperforate area, the outer periphery of said disk conforming to said smooth annular recess and anchored in the same with the axial outer cutting edges of said cutter in operative engagement with the axial inner face of said disk and the worm extending into the area between said teeth whereby the residual meat left in the meat chopper is reduced to a small amount.

4. In a food chopper, the combination of a tubular casing having an inner face with an outlet at one end and an inlet at the other end, ribs extending radially and inwardly from said face and having valleys between the ends thereof adjacent the outlet, there being a narrow annular recess between said face and said outlet, a narrow hard metal ring in said narrow annular recess having a multiplicity of teeth terminating at their inner radially extending ends in substantial alinement with said ribs with their axially inward ends chamfered, a plurality of said teeth being located in the valleys between the discharge ends of said ribs, there being a smooth annular recess in said ring extending axially and outwardly from said teeth and forming a cylindrical bearing face, the axial outer faces of said teeth forming a radially extending shoulder, a worm rotatably mounted in said casing for advancing the food to be cut in an axially outward direction and toward said cutting teeth and said outlet, a narrow cutter mounted on the discharge end of the worm to rotate with the same and having a plurality of arms having their outer peripheries cooperating with said cylindrical bearing face to take up the radial thrust of said worm, said cutter having axial inner and outer cutting edges and said inner cutting edges being in operative engagement with the outer faces of said teeth, and a circular disk having a plurality of perforations disposed about a circular imperforate area, the outer periphery of said disk conforming to said smooth annular recess and anchored in the same with the axial outer cutting edges of said cutter in operative engagement with the axial inner face of said disk and the worm extending into the area between said teeth whereby the residual meat left in the meat chopper is reduced to a small amount.

5. An improved meat chopper which comprises a tubular casing having an inlet at the rear end, a shoulder at the front end and internal ribs, a worm rotatably mounted in said casing for advancing meat to be chopped from said inlet to said front end and having a clearance between its rear end and the rear of said casing, a ring-like sleeve means composed of hard metal compared with the metal of the casing and seated against said shoulder, said sleeve means having a multiplicity of stationary cutting teeth, there being a plurality of said teeth between the front ends of succeeding ribs extending outwardly from said shoulder, the worm extending through the ring-like sleeve means, a stationary perforated disk having an annular series of small openings disposed and fixedly mounted at the front end of said casing parallel to a plane passing through the front of said teeth, and a single integral cutter fixedly anchored to the front of said worm to fully fill the space between said stationary cutting teeth and said disk without the occurrence of pockets to harbor any meat particles, said cutter having radially extending arms with rear cutting edges to shear meat advancing as an annular mass through said stationary cutting teeth and with front cutting edges engaging the rear face of said disk to shear the ribbons of meat passing through the small openings in said disk, said sleeve means having a portion extending axially from the teeth to and beyond the inner face of the disk, the ends of the cutter arms forming a radial thrust bearing with said sleeve portion.

ARNOLD W. LUNDELL.

References Cited in the file of this patent

UNITED STATES PATENTS

| Number | Name | Date |
|--------|------|------|
| 431,230 | Leopold | July 1, 1890 |
| 478,823 | Shaw | July 12, 1892 |
| 745,079 | Smith | Nov. 24, 1903 |
| 820,990 | Saunders | May 22, 1906 |

FOREIGN PATENTS

| Number | Country | Date |
|--------|---------|------|
| 67,917 | Germany | Sept. 4, 1892 |
| 17,616 | Great Britain | of 1893 |
| 257,407 | Great Britain | Sept. 12, 1946 |